US012210878B2

(12) United States Patent
Gazit et al.

(10) Patent No.: US 12,210,878 B2
(45) Date of Patent: Jan. 28, 2025

(54) SYSTEM AND METHOD FOR CODE EXECUTION ON BROWSER EXTENSION

(71) Applicant: Karma Shopping Ltd., Tel Aviv (IL)

(72) Inventors: Omer Gazit, Hod HaSharon (IL); Oleg Rubin, Tel Aviv (IL)

(73) Assignee: Karma Shopping Ltd., Tel Aviv (IL)

( * ) Notice: Subject to any disclaimer, the term of this patent is extended or adjusted under 35 U.S.C. 154(b) by 137 days.

(21) Appl. No.: 18/174,851

(22) Filed: Feb. 27, 2023

(65) Prior Publication Data

US 2024/0289131 A1    Aug. 29, 2024

(51) Int. Cl.
| | |
|---|---|
| *G06F 9/44* | (2018.01) |
| *G06F 3/00* | (2006.01) |
| *G06F 9/38* | (2018.01) |
| *G06F 9/445* | (2018.01) |
| *G06F 9/455* | (2018.01) |
| *G06F 15/00* | (2006.01) |
| *G07F 17/30* | (2006.01) |
| *H04L 41/0246* | (2022.01) |

(52) U.S. Cl.
CPC .......... *G06F 9/3836* (2013.01); *G06F 9/3802* (2013.01); *G06F 9/44526* (2013.01); *H04L 41/0246* (2013.01)

(58) Field of Classification Search
CPC .. G06F 9/3836; G06F 9/3802; G06F 9/44526; G06F 21/6227; G06F 8/31; G06F 9/4488; G06F 9/45508; G06F 40/143; G06F 8/34; G06F 16/958; G06F 40/131; G06F 40/117; G06F 40/226; G06F 40/154; H04L 41/0246; H04L 41/145
See application file for complete search history.

(56) References Cited

U.S. PATENT DOCUMENTS

| | | | |
|---|---|---|---|
| 7,165,243 B1 * | 1/2007 | Pelegri-Llopart | G06F 8/31 717/136 |
| 8,549,472 B1 * | 10/2013 | Tilwani | G06F 40/143 717/109 |
| 9,473,522 B1 | 10/2016 | Kotler et al. | |
| 10,193,839 B2 | 1/2019 | Tandon et al. | |
| 10,374,884 B2 * | 8/2019 | Dec | H04L 41/145 |
| 10,505,969 B2 | 12/2019 | Gorodissky et al. | |
| 11,449,619 B2 | 9/2022 | Kotler et al. | |

* cited by examiner

*Primary Examiner* — Thuy Dao
(74) *Attorney, Agent, or Firm* — M&B IP Analysts, LLC

(57) ABSTRACT

A system and method provides instructions for execution to a software extension module. The method includes establishing a network connection between a software extension module and an instruction source; generating a textual instruction from an instruction of the instruction source; and sending the generated textual instruction to the software extension module over the established network connection, wherein the software extension module is configured to receive the textual instruction and generate therefrom the instruction of the instruction source.

17 Claims, 5 Drawing Sheets

SYSTEM AND METHOD FOR CODE EXECUTION ON BROWSER EXTENSION

TECHNICAL FIELD

The present disclosure relates generally to software extension components and specifically to reducing processor overhead when updating a component of a software extension.

BACKGROUND

A major advantage of computer software is the ability to update software in order to achieve more features from an otherwise unaltered hardware setup. For example, there are clear advantages to upgrading a computer's operating system from an older version to a newer version which offers more features, more functionality, and a better user experience, all while preserving the original computer's hardware.

To this end, many software applications allow third party extensions, popularly known as plug-ins. Typically, a software application which supports third party extensions, known as a host application, includes a plug-in manager component having an interface with which a plug-in, third party extension, and the like, can interface with. This allows the host application to utilize the extension, thereby adding functionality to the host application.

Certain host applications, such as web browsers, may require a third party developer to preauthorize code for a software extension with the host application owner. For example, extensions for the Google® Chrome® web browser need to be approved by a review team before they are available on the Chrome Web Store. The Web Store is a repository which is accessible by a user device to download approved extensions. This ensures that user devices do not download unsupervised code which could cause harm, such as malware.

However, this also presents a challenge to software developers, as any change to the code of their software extension, no matter how insignificant, requires review, which could take days to complete.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing instructions for execution to a software extension module. The method also includes establishing a network connection between a software extension module and an instruction source; generating a textual instruction from an instruction of the instruction source; and sending the generated textual instruction to the software extension module over the established network connection, where the software extension module is configured to receive the textual instruction and generate therefrom the instruction of the instruction source. Other embodiments of this aspect include corresponding computer systems, apparatus, and computer programs recorded on one or more computer storage devices, each configured to perform the actions of the methods.

One general aspect includes a non-transitory computer readable medium having stored thereon instructions for causing a processing circuitry to execute a process. The non-transitory computer readable medium also includes establishing a network connection between a software extension module and an instruction source; generating a textual instruction from an instruction of the instruction source; and sending the generated textual instruction to the software extension module over the established network connection, where the software extension module is configured to receive the textual instruction and generate therefrom the instruction of the instruction source. Other embodiments of this aspect include corresponding computer systems, apparatus, and computer programs recorded on one or more computer storage devices, each configured to perform the actions of the methods.

One general aspect includes a system for providing instructions for execution to a software extension module. The system also includes a processing circuitry. The system also includes a memory, the memory containing instructions that, when executed by the processing circuitry, configure the system to: establish a network connection between a software extension module and an instruction source; generate a textual instruction from an instruction of the instruction source; and send the generated textual instruction to the software extension module over the established network connection, where the software extension module is configured to receive the textual instruction and generate therefrom the instruction of the instruction source. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
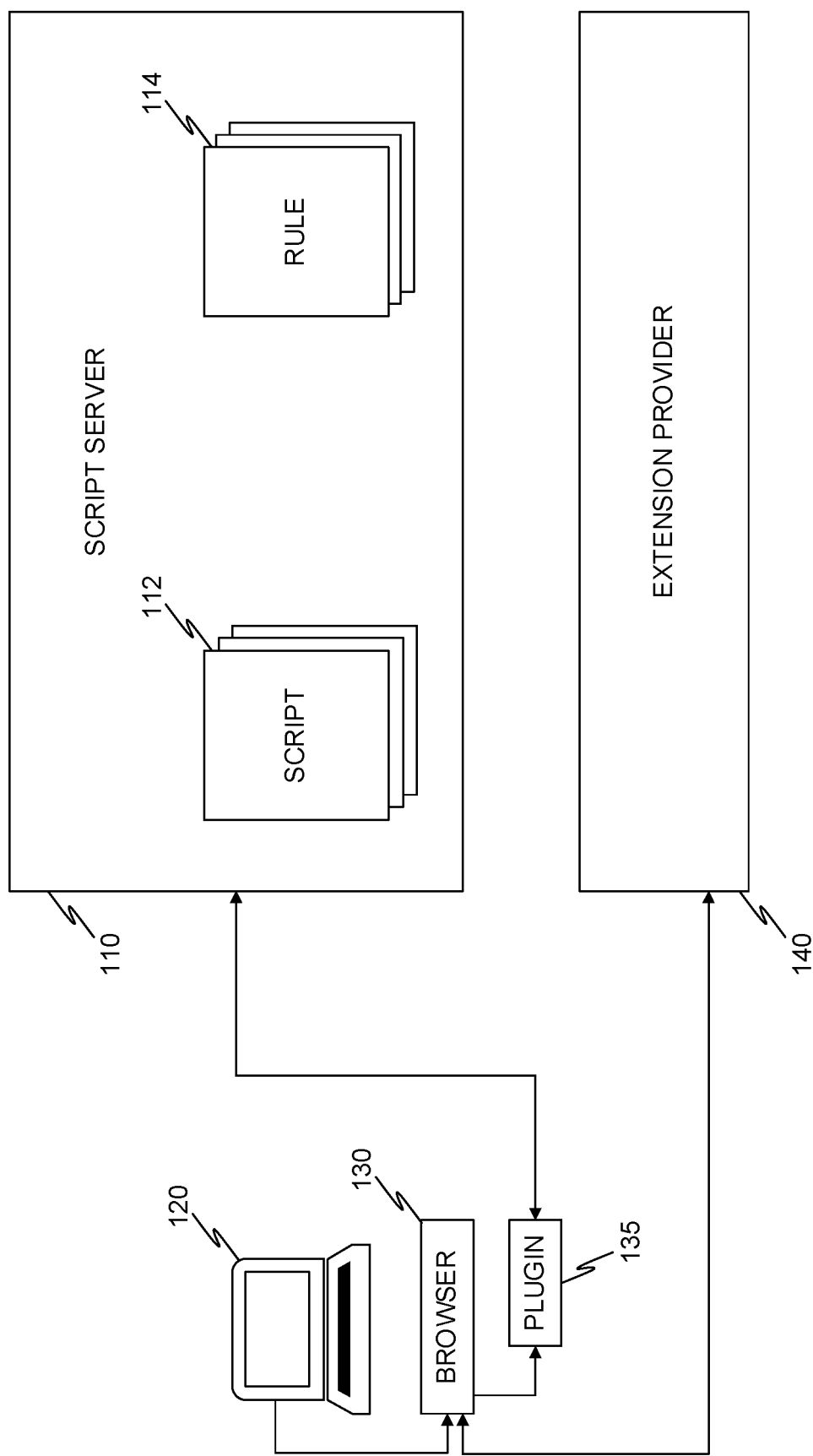
FIG. 1 is an example schematic illustration of a script server and client device, utilized to described an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for updating a software extension module, plugin, third party extension, extension, add-on, and the like, deployed on a client device. In an embodiment, the software extension module is provided to the client device through a web store, repository, and the like, which requires that software modules provided through, for example, the repository, are inspected for security issues, and the like.

This presents a challenge in updating the software extension module code, despite the update being innocuous. This is especially true, for example, for rules supplied to a rule engine executed on a client device, as rules may change at a high rate. For example, network access rules (e.g., which network addresses are allowable, which are not, etc.) are examples of rules which change at a high rate, according to an embodiment.

On advantage of the teachings disclosed herein allows to circumnavigate this challenge, by providing, for example, the update to the software extension module as a text file, markup language document, and the like, which the software extension module is configured to receive and generate therefrom executable code.

As used herein, a plugin, a third party extension, extension, add-on, and the like terms are used interchangeably, unless otherwise indicated. While it is recognized that certain applications, such as Mozilla® Firefox® distinguish between these terms, for the purpose of this application a plugin, extension, and the like, refer to a code executable on a processing unit, instructions which are translatable into code, and the like, which provide functionality to an application which is beyond the functionality provided in the application itself. In some embodiments, the plugin, third party extension, extension, add-on, and the like, are also referred to as an agent.

FIG. 1 is an example schematic illustration of a script server and client device, utilized to described an embodiment. In an embodiment, a client device 120 includes a web browser 130 (also referred to as browser 130). In certain embodiments, the browser 130 is an application executed on an operating system of the client device 120. In some embodiments, the browser 130 is, for example, Mozilla® Firefox®, Apple® Safari®, Google® Chromium®, and the like.

In an embodiment, a client device 120 is, for example, a computer, a desktop, a laptop, a tablet, a smartphone, a user device, and the like. In certain embodiments, the client device 120 includes a display, configured to display an output rendered based on instructions initiated by the browser application 130, and an I/O interface, configured to receive an input from a user. An I/O interface includes, for example, a keyboard, a mouse, a touchscreen, a combination thereof, and the like.

In some embodiments, the browser 130 is configured to access an extension provider 140. An extension provider 140 is, according to an embodiment, a repository which includes software extension modules, for example in the form of downloadable executable files, which when executed by a processing circuitry of a client device, configure the client device to perform an extended instruction, which is based on an instruction of the browser 130.

In an embodiment, the extension provider 140 is deployed, for example, as a virtual machine, software container, serverless function, combination thereof, and the like. For example, in an embodiment, the extension provider 140 is Chrome Web Store, which provides extensions, addons, plugins, and the like, for the Chrome web browser application.

The plugin 135 is configured to access a script server 110 and receive an input from the script server 110, according to an embodiment. In certain embodiment, the script server 110 is an instruction source, i.e., a source from which the plugin receives a script, a rule, a combination thereof, and the like. In some embodiments, the plugin 135 is configured to periodically connect to the script server 110, for example over a network connection, and check if a new input is available. In some embodiments, the input is a script 112, a rule 114, and the like. For example, in an embodiment, a script 112 includes a software application, a computer instruction, a binary file, an executable code, a machine code, a markup language document, a text, a string, a combination thereof, and the like.

In certain embodiments, the plugin 135 is configured to execute the received input. For example, in an embodiment, the plugin 135 is configured to receive a script 112, generate a computer instruction based on the received script 112, and configure a processing circuitry of the client device 120 to execute the generated computer instruction.

In an embodiment, the plugin 135 includes a rule engine. A rule engine includes a plurality of rules, policies, and the like, according to an embodiment. In some embodiments, the plugin 135 is configured to receive a rule 114. A rule includes, according to an embodiment, a condition which is applied, for example, to a value, data field, and the like. For example, in an embodiment, the plugin 135 is configured to generate an overlay on a web page displayed by the browser 130.

In some embodiments, the plugin 135 is configured to generate the overlay based on a rule. For example, in an embodiment a rule 114 states that a first graphic should be generated in response to detecting a first value on a web page. In such an embodiment, the plugin 135 is configured to detect in the web page a data field corresponding to the first value, apply a condition of the rule 114 to the value, and generate an instruction to render the first graphic in response to the condition of the rule being met.

In certain embodiments, the plugin 135 is configured to periodically communicate with the script server 110 to determine if a new rule should be received. For example, in an embodiment, the plugin 135 is configured to initiate communication with the script server 110 at a predetermined network address, using a predetermined port, and a predetermined protocol. In some embodiments, the network address is an IP address, the port is 8080, and the protocol is hypertext transfer protocol secure (HTTPS).

In an embodiment, the script server 110 is configured to listen at a predetermined port for a communication initiated from a client device 120 through a plugin 135. In some embodiments, the plugin 135 configures a network interface controller (NIC) of the client device 120 to initiate a connection, for example over a network (including, e.g., the Internet), to the script server 110.

In some embodiments, the script server 110 is configured to request a version number from the plugin 135. For example, in an embodiment, the plugin 135 includes a version number which pertains to a software version of the plugin 135. In certain embodiments, the plugin 135 includes a version number of a script 112, a rule 114, and the like, which were previously received by the plugin 135 from the script server 110, or from another script server.

In an embodiment, the plugin 135 provides the script server 110 with a time identifier, corresponding to the last update, i.e., the last time an input was received by the plugin 135 from the script server 110. In some embodiments, the script server 110 is configured to compare the time identifier with a value corresponding to a script, rule, and the like, stored on the script server, to determine if there is a script, rule, and the like, which was not sent to the plugin 135.

Figure 2:
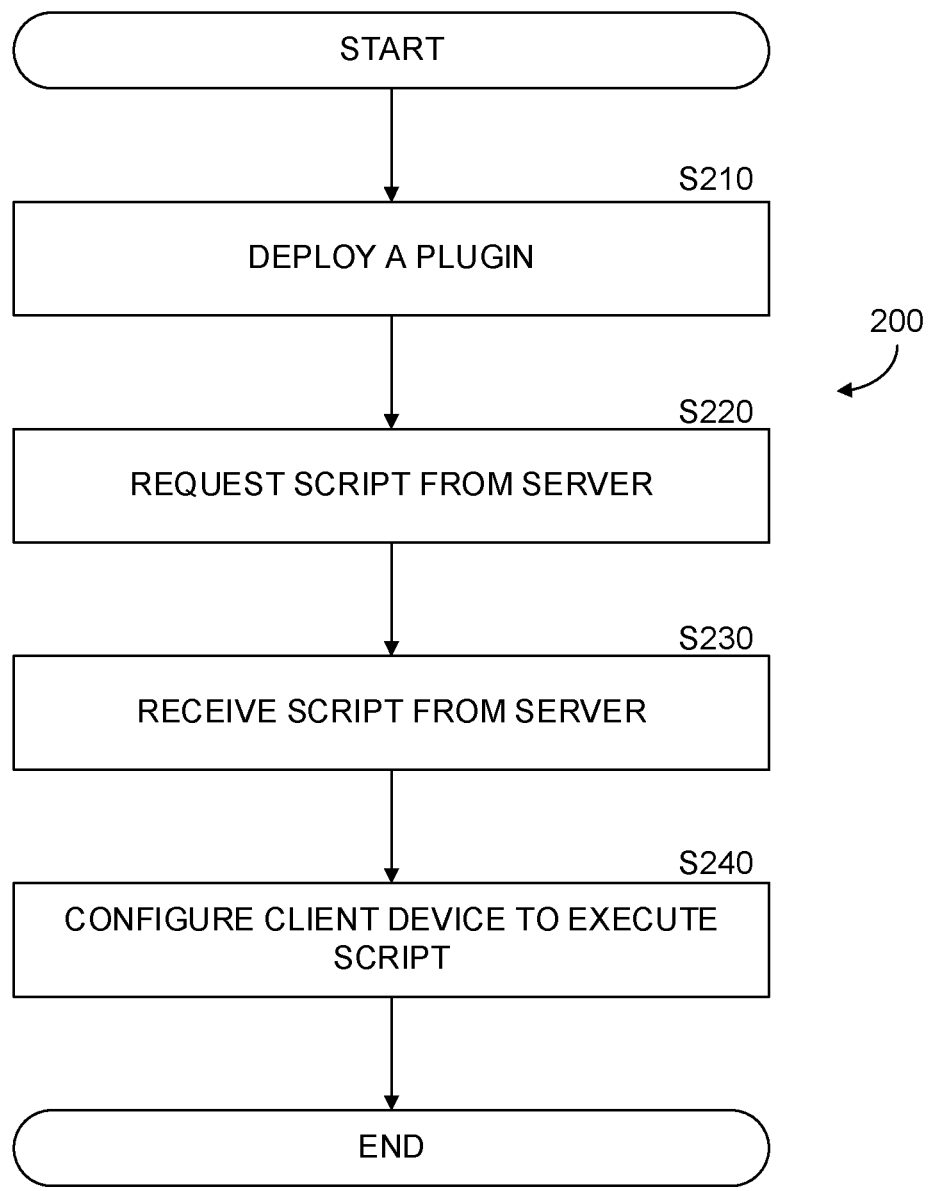
FIG. 2 is an example flowchart of a method for providing executable scripts to a software extension module, implemented in accordance with an embodiment.

FIG. 2 is an example flowchart of a method for providing executable scripts to a software extension module, implemented in accordance with an embodiment. In certain embodiments, the scripts are not executable. For example, the script includes a text which, when compiled, generates an executable instruction, according to an embodiment. In some embodiments, an executable instruction is received, for example by a script server, and a text is generated based on the executable instruction. The text is provided to a software extension module (e.g., a plugin) which is configured, according to an embodiment, to generate an executable instruction based on the text.

At S210, a plugin is deployed. In an embodiment, the plugin is deployed on a computing device having a host software application. In certain embodiments, the plugin is configured to communicate with a host application, wherein the host application is deployed on a computing device. In some embodiments, deploying the plugin includes accessing a repository, receiving an instruction set, and executing the instruction set to install the plugin software module on the computing device.

In an embodiment, the plugin is distinct from a host application, in that the plugin cannot be deployed "stand-alone", meaning that the plugin needs to be deployed while a host application is deployed in order to provide additional functionality to the host application.

In some embodiments, the host applications includes an I/O interface, an application programming interface, and the like, which configure the host application to communicate with a plugin, an add-on, an extension, and the like software modules which provide a function which is not provided natively by the host application.

At S220, a script is requested. In an embodiment, a script includes a software application, a computer instruction, a binary file, an executable code, a machine code, a markup language document, a text, a string, a combination thereof, and the like.

In an embodiment, the plugin is configured to periodically communicate with a script server to request a script. For example, in an embodiment, the plugin is configured to initiate a communication session, for example over a network, with the script server.

In certain embodiments, the plugin is configured to initiate communication with the script server at a predetermined network address, using a predetermined port, and a predetermined protocol. In some embodiments, the network address is an IP address, the port is 8080, and the protocol is hypertext transfer protocol secure (HTTPS).

In an embodiment, the script server is configured to listen at a predetermined port for a communication initiated from a client device through a plugin. In some embodiments, the plugin configures a network interface controller (NIC) of the client device to initiate a connection, for example over a network (including, e.g., the Internet), to the script server.

In some embodiments, the script server is configured to request a version number from the plugin. For example, in an embodiment, the plugin includes a version number which pertains to a software version of the plugin. In certain embodiments, the plugin includes a version number of a script, a rule, and the like, which were previously received by the plugin from the script server, or from another script server. In such embodiments, the plugin, the script server, both, and the like, are configured to determine, based on the version number, if a script on the script server is a newer version than a script installed on the client device on which the plugin is deployed.

In an embodiment, the plugin is configured to provide the script server with a time identifier, corresponding to the last update, i.e., the last time an input was received by the plugin from the script server. In some embodiments, the script server is configured to compare the time identifier with a value corresponding to a script, rule, and the like, stored on the script server, to determine if there is a script, rule, and the like, which was not sent to the plugin.

At S230, a script is received. In an embodiment, the script is received from a script server which is configured to send a most-recent version of a script in response to receiving a request for a script. In certain embodiments, the script is received by the plugin, which is further configured to store a plurality of script versions. In some embodiments, the plugin is configured to execute instructions based on the most-recent version of a script which is available to the plugin.

In certain embodiments, the plugin is further configured to executed a version which is not the most-recent version of the script, in response to detecting that the most-recent version of the script does not execute correctly. For example, in an embodiment, the plugin is configured to detect memory usage, processor usage, a combination thereof, and the like, and determine, based on such detected usage, if the most-recent version of the script, when executed, utilizes more computing resources than a previous version of the script, more resources than a predetermined threshold, a combination thereof, and the like.

At S240, the script is executed. In an embodiment, the plugin is configured to configure the client device to execute the script, to execute an instruction based on the script, a combination thereof, and the like.

For example, in an embodiment, the plugin is configured to receive a script, generate a computer instruction based on the received script, and configure a processing circuitry of a client device to execute the generated computer instruction.

In an embodiment, the plugin includes a rule engine. A rule engine includes a plurality of rules, policies, and the like, according to an embodiment. In some embodiments, the plugin is configured to receive a rule. A rule includes, according to an embodiment, a condition which is applied, for example, to a value, data field, and the like. For example, in an embodiment, the plugin is configured to generate an overlay on a web page displayed by the browser.

In some embodiments, the plugin is configured to generate the overlay based on a rule. For example, in an embodiment a rule states that a first graphic should be generated in response to detecting a first value on a web page. In such an embodiment, the plugin is configured to detect in the web page a data field corresponding to the first value, apply a condition of the rule to the value, and generate an instruction to render the first graphic in response to the condition of the rule being met.

Figure 3:
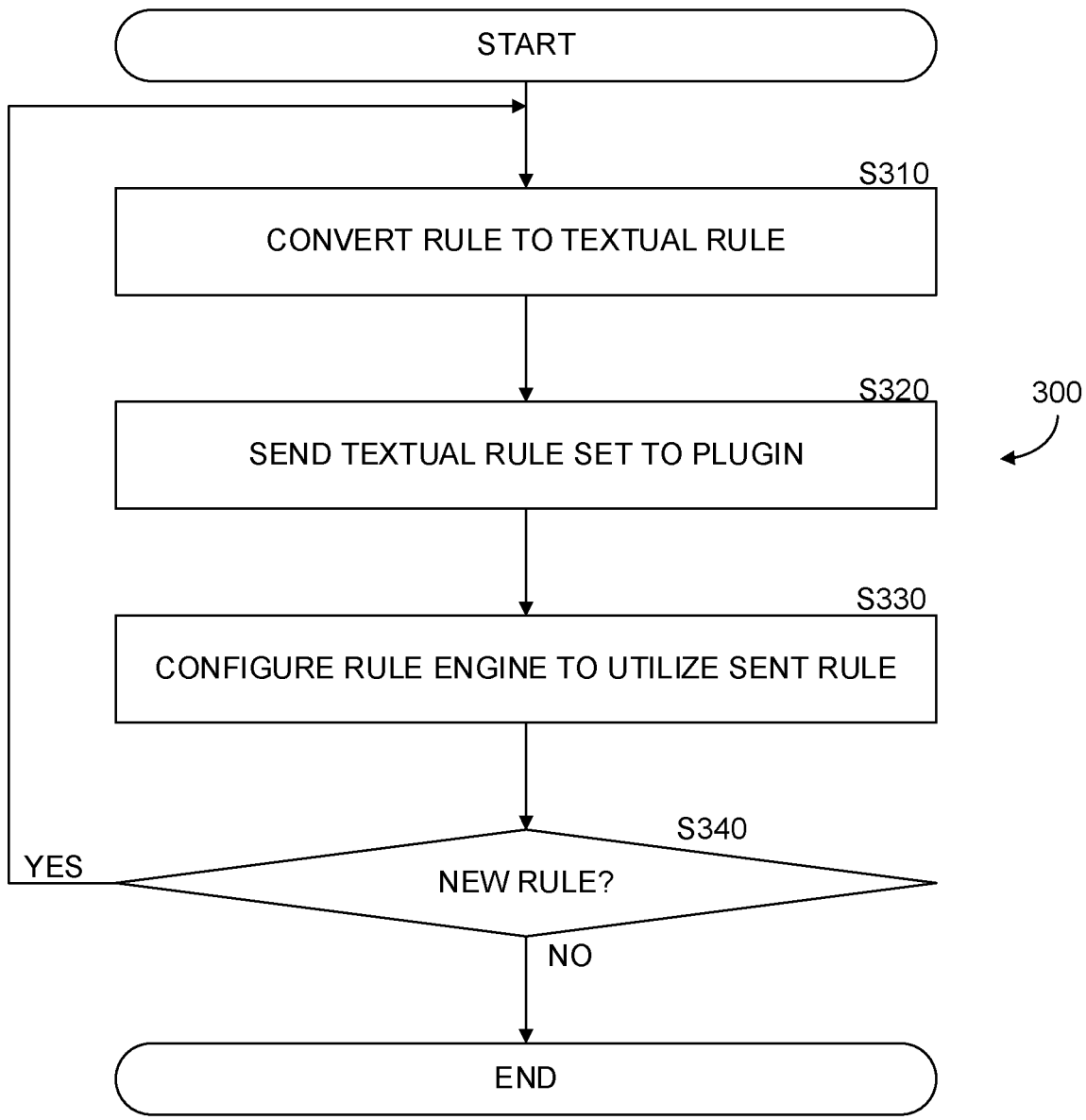
FIG. 3 is an example flowchart of a method for providing rules for a rule engine executable on a client device, implemented in accordance with an embodiment.

FIG. 3 is an example flowchart of a method for providing rules for a rule engine executable on a client device, implemented in accordance with an embodiment. In certain embodiments, a software extension module, such as a browser plugin, requires some verification provided by, for example, a software publisher which publishes the browser software. For example, Microsoft® is a software publisher which publishes the Edge® web browser software application.

This is useful for the software publisher to ensure that no malicious third party software extension modules are executed over the publisher's software. In some embodiments, a software publisher configures their software, e.g., the web browser, to inspect updates for a plugin to ascertain that they do not contain executable code. In such embodiments, it is useful to convert rules, code, and the like, to text, and send the text to a client device executing the software with a software extension module, wherein the software extension module is preconfigured to receive the text, convert the text to a rule, a code, and the like, and proceed to execute, deploy, and the like, the rule, the code, etc.

At S310, a rule is converted to text. In an embodiment, the rule includes instruction code which when executed configures a processing circuitry to perform a comparison, a test, and the like. In some embodiments, the rule includes instruction code which when executed configures a processing circuitry to apply a condition on a value.

In an embodiment, the rule is converted to a text rule. A text rule is a plain text data, such as a string, a clear text, a combination thereof, and the like. In some embodiments, the text rule further includes an indicator. In certain embodiments, the indicator is also stored as text. For example, in an embodiment, the indicator indicates whether a text should be converted to a first type of rule, a second type of rule, a first type of computer code, a second type of computer code, and the like.

At S320, the textual rule is sent to a software extension module. In an embodiment, the software extension module is a plugin deployed on a client device, and is further configured to request a rule. In certain embodiments, the rule is requested from a server, such as the script server 110 of FIG. 1 above. In an embodiment, a server is configured to periodically send a textual rule to a plugin. In some embodiments, the plugin is configured to communicate periodically with a server to determine if a rule is available to be sent to the plugin.

For example, in an embodiment, a plugin is configured to initiate a network connection between the plugin and a server. In certain embodiments, the plugin is configured to initiate communication with the script server at a predetermined network address, using a predetermined port, and a predetermined protocol. In some embodiments, the network address is an IP address, the port is 8080, and the protocol is hypertext transfer protocol secure (HTTPS).

In some embodiments, a rule includes a condition, which is applied, for example, on a value of a data field. In an embodiment, the plugin is configured to extract a value from a data field of a web page. For example, the web page is, according to an embodiment, a web page requested by a web browser application which the plugin is communicatively coupled to. In an embodiment, the web page includes a markup language document, such as a hypertext markup language document (HTML).

At S330, the rule is utilized. In some embodiments, the textual rule is converted to a rule which can be utilized by a rule engine. For example, in certain embodiments, a software extension module, such as a plugin, is configured to receive a textual rule, and convert the textual rule to a rule which can be utilized by a rule engine.

In an embodiment, the rule is utilized by a rule engine executed by a plugin installed on a client device. In certain embodiments, the plugin is configured to parse the web page, detect a data field, extract a value associated with the data field, and apply a rule to the extracted value, wherein the rule is generated by the plugin which is configured to generate a rule based on a received textual rule.

In an embodiment, a rule includes a condition which compares the value to a predetermined value. For example, in an embodiment, the data field is an integer, and the value is compared to a predetermined numerical value. Where the value is higher than the predetermined numerical value, the plugin is configured to execute an instruction.

For example, in an embodiment, the instruction includes generating additional markup language code for display by the web browser. An additional markup language code generates, according to an embodiment, an overlay which is displayed on top of an existing web page.

At S340, a check is performed to determine if another rule should be sent. In an embodiment, the check is performed periodically. In some embodiments, the server is configured to send an instruction to the plugin which configures the plugin to check for a new rule at a predetermined time in the future. For example, in an embodiment, in response to receiving from the plugin a request to check for another rule, the server sends the client device a time data (e.g., 10 minutes), so that the plugin, in response to receiving the time data, is configured to perform the check again in a time frame corresponding to the time data (e.g., in 10 minutes from when the time data is received). In an embodiment, if 'yes' execution continues at S310. In some embodiments, if 'no', execution terminates.

In some embodiments, the plugin is configured to determine a version number associated with the plugin. In certain embodiments, the plugin is further configured to access a web store, determine if a plugin version of the web store is more up to date than the plugin version installed on the client device, and install an updated version of the plugin (i.e., the more up to date plugin version) on the client device on which the plugin is deployed.

In certain embodiments, a text (e.g., a textual rule) is generated based on an executable instruction, a rule, a script, and the like. In some embodiments, the plugin is configured to receive the generated text, and generate an executable instruction based on the generated text. This is useful, for example, where executable code cannot be supplied to the plugin, such as where sending executable code to a plugin violates a security policy of a software publisher which publishes the software for which the plugin provides a software extension module.

In an embodiment, the plugin is configured to receive the generated text, and generate therefrom an executable instruction. According to an embodiment, an executable instruction is, for example, a markup language document. In some embodiments, the executable instruction is machine code, binary code, and the like. The executable instruction is compiled by a compiler of the plugin, according to an embodiment.

Figure 4:
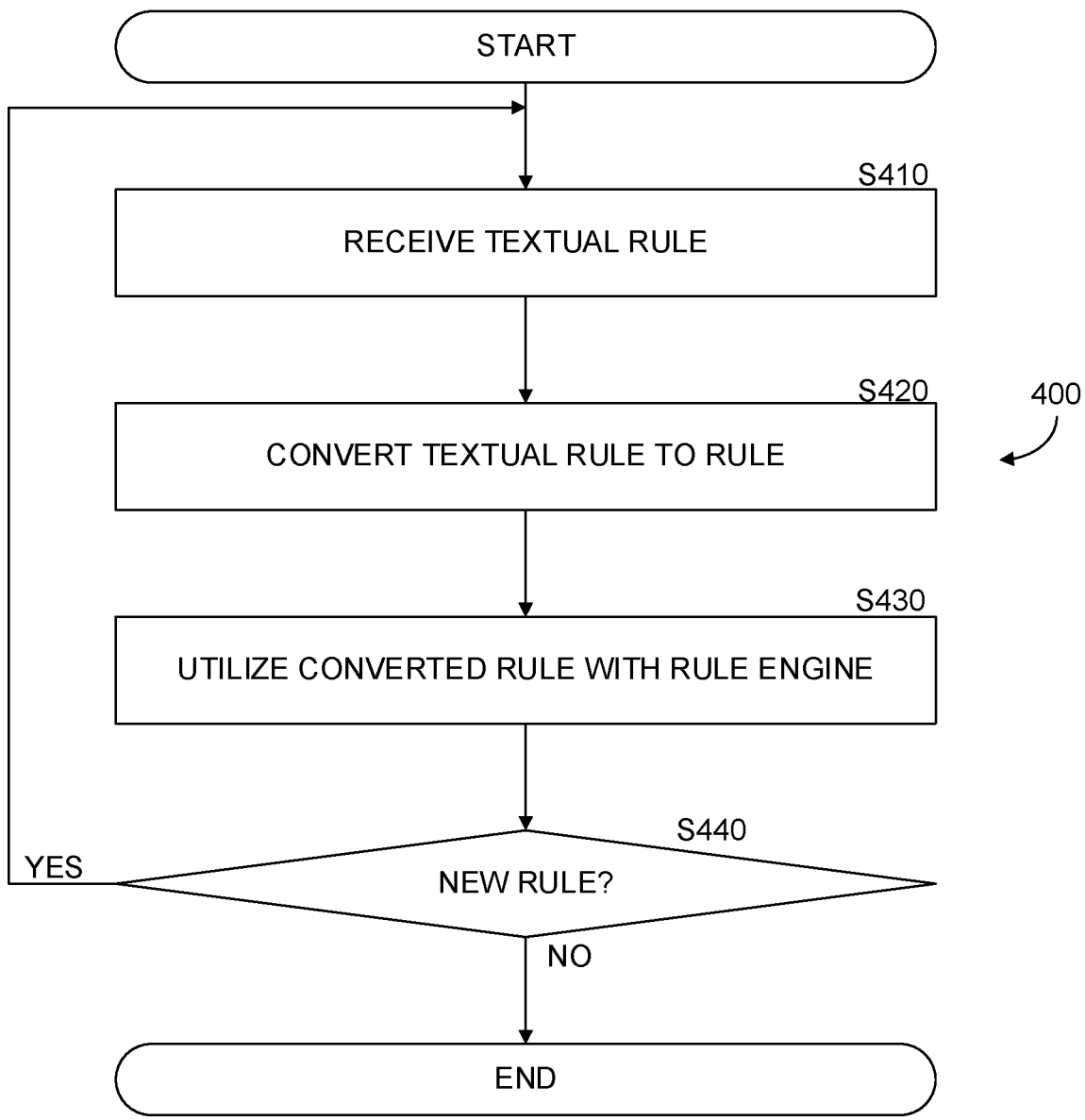
FIG. 4 is an example flowchart of a method for utilizing rules by a software extension module, implemented in accordance with an embodiment.

FIG. 4 is an example flowchart of a method for utilizing rules by a software extension module, implemented in accordance with an embodiment.

At S410, a textual rule is sent to a software extension module. In an embodiment, the software extension module is a plugin deployed on a client device, and is further configured to request a rule. In certain embodiments, the rule is requested from a server, such as the script server 110 of FIG. 1 above. In an embodiment, a software extension module is configured to periodically receive a textual rule from a server. In some embodiments, the plugin is configured to communicate periodically with a server to determine if a rule is available to be sent to the plugin.

For example, in an embodiment, a plugin is configured to initiate a network connection between the plugin and a server. In certain embodiments, the plugin is configured to initiate communication with the script server at a predetermined network address, using a predetermined port, and a predetermined protocol. In some embodiments, the network address is an IP address, the port is 8080, and the protocol is hypertext transfer protocol secure (HTTPS).

In some embodiments, a rule includes a condition, which is applied, for example, on a value of a data field. In an embodiment, the plugin is configured to extract a value from a data field of a web page. For example, the web page is, according to an embodiment, a web page requested by a web browser application which the plugin is communicatively coupled to. In an embodiment, the web page includes a markup language document, such as a hypertext markup language document (HTML).

At S420, the textual rule is converted to a rule. In an embodiment, a rule is utilized by a rule engine. In certain embodiments, a plugin is configured to receive a textual rule, and generate therefrom a rule which can be utilized by a rule engine, thereby converting the textual rule into a rule.

For example, in certain embodiments, a software extension module, such as a plugin, is configured to receive a textual rule, and convert the textual rule to a rule which can be utilized by a rule engine. This allows to circumvent a check performed by a software publisher, a check performed by a software application using a software extension module, and the like, in order to update rules of a rule engine executed by the software extension module, without requiring an update of the software extension module which is provided by a web store of the software publisher. Performing updating of rules in this manner allows to cut down significantly in software deployment time. This is due at least to the circumvention of a check performed by the software publisher, and publishing a new software extension module through the web store, both of which can take a significant amount of time.

At S430, the converted rule is utilized. In an embodiment, the converted rule is utilized by a rule engine of a software extension module. For example, in certain embodiments, a software extension module, such as a plugin, is configured to receive a textual rule, and convert the textual rule to a rule which can be utilized by a rule engine.

In an embodiment, the rule is utilized by a rule engine executed by a plugin installed on a client device. In certain embodiments, the plugin is configured to parse a web page, detect a data field, extract a value associated with the data field, and apply a rule to the extracted value, wherein the rule is generated by the plugin which is configured to generate a rule based on a received textual rule.

In an embodiment, a rule includes a condition which compares the value to a predetermined value. For example, in an embodiment, the data field is an integer, and the value is compared to a predetermined numerical value. Where the value is higher than the predetermined numerical value, the plugin is configured to execute an instruction.

For example, in an embodiment, the instruction includes generating additional markup language code for display by the web browser. An additional markup language code generates, according to an embodiment, an overlay which is displayed on top of an existing web page.

Figure 5:
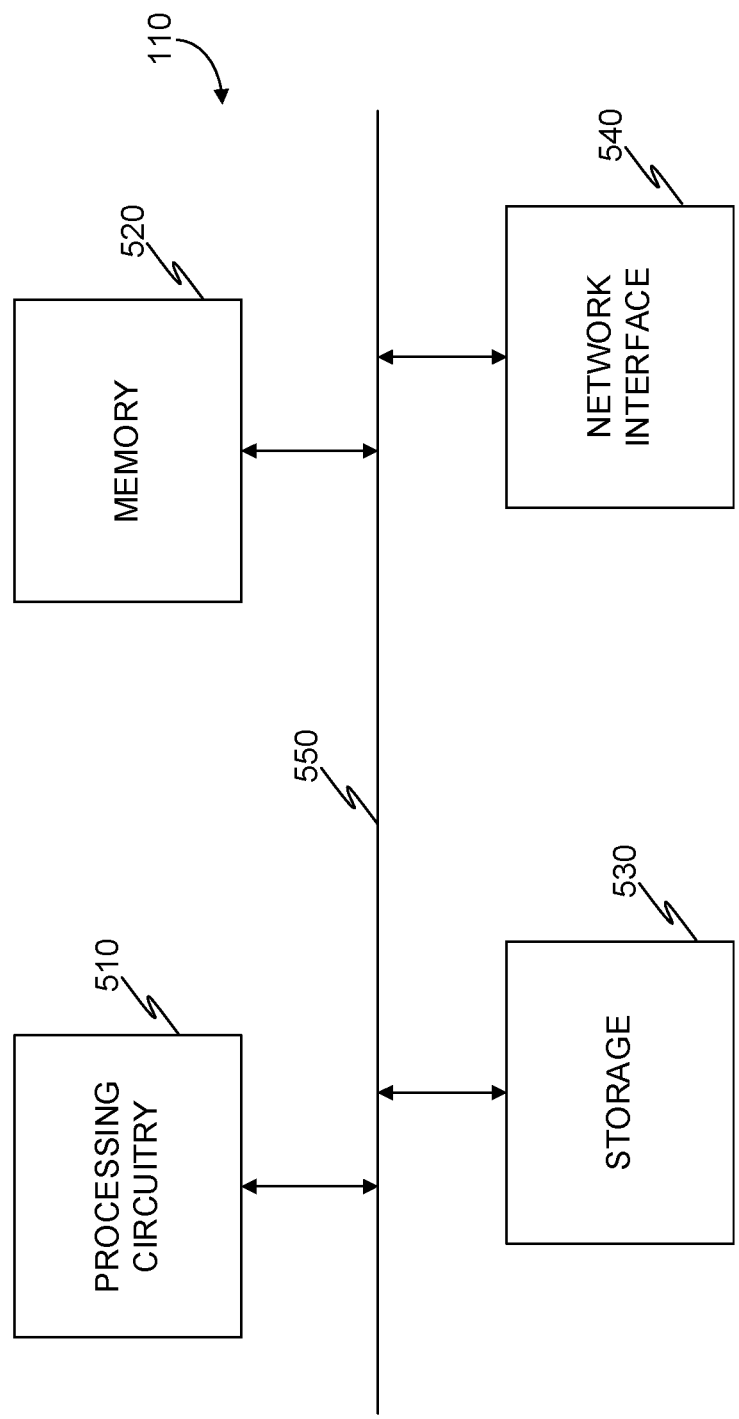
FIG. 5 is an example schematic diagram of a script server according to an embodiment.

FIG. 5 is an example schematic diagram of a script server 110 according to an embodiment. The script server 110 includes a processing circuitry 510 coupled to a memory 520, a storage 530, and a network interface 540. In an embodiment, the components of the script server 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the script server 110 with communication with, for example, the client device 120.

It should be understood that the embodiments described herein are not limited to the specific architecture illustrated in FIG. 5, and other architectures may be equally used without departing from the scope of the disclosed embodiments.

Furthermore, in certain embodiments the client device 120 may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing instructions for execution to a software extension module, comprising:
    establishing a network connection between a software extension module and an instruction source;
    generating a textual instruction from an instruction of the instruction source;
    sending the generated textual instruction to the software extension module over the established network connection, wherein the software extension module is configured to receive the textual instruction and generate therefrom the instruction of the instruction source;
    periodically establishing the network connection to detect an instruction which was not previously sent to the software extension module; and
    generating a second textual instruction based on the detected instruction to send to the software extension module.

2. The method of claim 1, further comprising:
    configuring the software extension module to generate the instruction of the instruction source based on the generated textual instruction.

3. The method of claim 2, further comprising:
    configuring the software extension module to execute the generated instruction of the instruction source.

4. The method of claim 2, further comprising:
    configuring the software extension module to compile executable computer code based on the generated textual instruction.

5. The method of claim 1, further comprising:
    configuring the software extension module to extract a data field value from a document accessible by the software extension module;
    configuring the software extension module to apply a rule to the extracted data field value to a predetermined value; and
    configuring the software extension module to initiate an instruction based on the outcome of the applied rule.

6. The method of claim 5, wherein the execution instruction includes the rule.

7. The method of claim 1, further comprising:
    receiving a version number from the software extension module;
    determining based on the version number that the software extension module does not include a first execution instruction; and
    sending the first execution instruction to the software extension module.

8. The method of claim 1, wherein the software extension module is communicatively coupled to a web browser application deployed on a client device.

9. A non-transitory computer readable medium having stored thereon instructions for causing a processing circuitry to execute a process, the process comprising:
    establishing a network connection between a software extension module and an instruction source;
    generating a textual instruction from an instruction of the instruction source;
    sending the generated textual instruction to the software extension module over the established network connection, wherein the software extension module is configured to receive the textual instruction and generate therefrom the instruction of the instruction source;
    periodically establishing the network connection to detect an instruction which was not previously sent to the software extension module; and
    generating a textual instruction based on the detected instruction to send to the software extension module.

10. A system for providing instructions for execution to a software extension module, comprising:
    a processing circuitry; and
    a memory, the memory containing instructions that, when executed by the processing circuitry, configure the system to:
    establish a network connection between a software extension module and an instruction source;
    generate a textual instruction from an instruction of the instruction source;

send the generated textual instruction to the software extension module over the established network connection, wherein the software extension module is configured to receive the textual instruction and generate therefrom the instruction of the instruction source;
periodically establish the network connection to detect an instruction which was not previously sent to the software extension module; and
generate a textual instruction based on the detected instruction to send to the software extension module.

11. The system of claim 10, wherein the memory contains further instructions which when executed by the processing circuitry, further configure the system to:
configure the software extension module to generate the instruction of the instruction source based on the generated textual instruction.

12. The system of claim 11, wherein the memory contains further instructions which when executed by the processing circuitry, further configure the system to:
configure the software extension module to execute the generated instruction of the instruction source.

13. The system of claim 11, wherein the memory contains further instructions which when executed by the processing circuitry, further configure the system to:
configure the software extension module to compile executable computer code based on the generated textual instruction.

14. The system of claim 10, wherein the memory contains further instructions which when executed by the processing circuitry, further configure the system to:
configure the software extension module to extract a data field value from a document accessible by the software extension module;
configure the software extension module to apply a rule to the extracted data field value to a predetermined value; and
configure the software extension module to initiate an instruction based on the outcome of the applied rule.

15. The system of claim 14, wherein the execution instruction includes the rule.

16. The system of claim 10, wherein the memory contains further instructions which when executed by the processing circuitry, further configure the system to:
receive a version number from the software extension module;
determine based on the version number that the software extension module does not include a first execution instruction; and
send the first execution instruction to the software extension module.

17. The system of claim 10, wherein the software extension module is communicatively coupled to a web browser application deployed on a client device.

* * * * *